(12) United States Patent
Hamer et al.

(10) Patent No.: US 7,373,376 B1
(45) Date of Patent: May 13, 2008

(54) METHOD AND SYSTEM FOR EVALUATING QUALITY OF SERVICE OVER THE INTERNET

(75) Inventors: Eric Hamer, Belmont, CA (US); Kent Yee, San Francisco, CA (US); Don Aoki, Mountain View, CA (US); Umang Gupta, San Mateo, CA (US); Ronald E. Wolf, Palo Alto, CA (US); Frederick L. Mueller, Los Altos, CA (US)

(73) Assignee: Keynote Systems, Inc., San Mateo, CA (US)

( * ) Notice: Subject to any disclaimer, the term of this patent is extended or adjusted under 35 U.S.C. 154(b) by 0 days.

(21) Appl. No.: 09/475,765

(22) Filed: Dec. 30, 1999

(51) Int. Cl.
*G06F 15/16* (2006.01)

(52) U.S. Cl. .................. 709/203; 709/224; 714/39; 714/45; 714/47

(58) Field of Classification Search ........... 709/215, 709/207, 224, 320, 226, 203, 227; 717/127; 714/39, 45, 47
See application file for complete search history.

(56) References Cited

U.S. PATENT DOCUMENTS

| | | | | |
|---|---|---|---|---|
| 5,459,837 A * | 10/1995 | Caccavale | ............... | 709/226 |
| 5,557,746 A | 9/1996 | Chen et al. | ............ | 395/200.06 |
| 5,657,450 A | 8/1997 | Rao et al. | .................. | 395/610 |
| 5,696,701 A | 12/1997 | Burgess et al. | ........ | 364/551.01 |
| 5,696,965 A | 12/1997 | Dedrick | ....................... | 395/610 |
| 5,754,772 A | 5/1998 | Leaf | ....................... | 395/200.33 |
| 5,761,486 A | 6/1998 | Watanabe et al. | ........... | 395/500 |
| 5,761,663 A | 6/1998 | Lagarde et al. | ............... | 707/10 |
| 5,774,670 A | 6/1998 | Montulli | ................ | 395/200.51 |
| 5,790,798 A | 8/1998 | Beckett, II et al. | ..... | 395/200.54 |
| 5,790,977 A | 8/1998 | Ezekiel | ....................... | 702/122 |
| 5,796,633 A | 8/1998 | Burgess et al. | ........ | 364/551.01 |
| 5,796,952 A | 8/1998 | Davis et al. | ........... | 395/200.54 |
| 5,802,106 A | 9/1998 | Packer | ....................... | 375/225 |
| 5,805,815 A | 9/1998 | Hill | ....................... | 395/200.48 |
| 5,872,976 A * | 2/1999 | Yee et al. | .................... | 709/320 |
| 6,006,260 A * | 12/1999 | Barrick et al. | ............. | 709/202 |
| 6,094,673 A * | 7/2000 | Dilip et al. | .................. | 709/202 |
| 6,138,157 A * | 10/2000 | Welter et al. | ............... | 709/224 |
| 6,178,449 B1 * | 1/2001 | Forman et al. | ............. | 709/224 |
| 6,209,033 B1 * | 3/2001 | Datta et al. | .................. | 709/224 |
| 6,286,046 B1 * | 9/2001 | Bryant | ....................... | 709/224 |
| 6,314,463 B1 * | 11/2001 | Abbott et al. | ............... | 709/201 |
| 6,327,700 B1 * | 12/2001 | Chen et al. | .................. | 717/127 |
| 6,360,332 B1 * | 3/2002 | Weinberg et al. | ............... | 714/4 |
| 6,381,635 B1 * | 4/2002 | Hoyer et al. | ................ | 709/207 |
| 6,397,359 B1 * | 5/2002 | Chandra et al. | ............ | 709/224 |
| 6,418,544 B1 * | 7/2002 | Nesbitt et al. | ................ | 714/43 |
| 6,438,592 B1 * | 8/2002 | Killian | ....................... | 709/203 |
| 6,449,739 B1 * | 9/2002 | Landan | ....................... | 709/224 |
| 6,505,248 B1 * | 1/2003 | Casper et al. | ............... | 709/224 |

(Continued)

*Primary Examiner*—Phuoc H. Nguyen
(74) *Attorney, Agent, or Firm*—Cindy Kaplan

(57) ABSTRACT

A method of measuring performance of a transaction over a network. The transaction includes requesting information from an information source connected to the network and interacting with the information source. The method includes connecting a data acquisition agent to the network, sending a request for information from the data acquisition agent to the information source, and loading data responsive to the request for information onto the data acquisition agent. The transaction is executed and performance measurements for the transactions are collected and sent to a storage device. A system for measuring performance of a transaction over a network is also disclosed.

32 Claims, 9 Drawing Sheets

U.S. PATENT DOCUMENTS

| | | | |
|---|---|---|---|
| 6,519,714 B1 * | 2/2003 | Sweet et al. | 714/28 |
| 6,587,878 B1 * | 7/2003 | Merriam | 709/224 |
| 6,738,813 B1 * | 5/2004 | Reichman | 709/224 |
| 6,836,800 B1 * | 12/2004 | Sweet et al. | 709/224 |

* cited by examiner

METHOD AND SYSTEM FOR EVALUATING QUALITY OF SERVICE OVER THE INTERNET

BACKGROUND OF THE INVENTION

The present invention relates generally to evaluating quality of service provided over the Internet, and more particularly, to systems and methods for determining the amount of time it takes to perform a sequence of operations over the Internet.

With the explosive growth of the Internet, increased traffic has caused the performance experienced by users making connections over the Internet to vary widely. The longer it takes a user to download information from a web site, the more likely the user is to go to a competitor's web site. Thus, it is important for companies to be aware of the amount of time it takes users to download information from their Internet sites so that they can quickly identify problems, upgrade their equipment, modify the content of their web site, or otherwise increase the speed of delivery of information at their web site.

Many factors influence the performance of a connection including the user's modem and other equipment, the type of server, the load on the server, and the Internet service provider used. The first step in evaluating connection performance is to obtain reliable information regarding performance characteristics such as the time required to download web pages or other information across a connection.

One approach to measuring web site performance is to connect measurement agents to the Internet at various geographic locations. This approach is described in U.S. patent application Ser. No. 08/868,616, filed Jun. 3, 1997, by Barrick et al. The system disclosed therein uses a browser agent to send an HTTP GET command to a server and then record the amount of time it takes to complete transmission of the data. The agents evaluate the performance of a web site by measuring the amount of time it takes to download a web page. Due to their remote location, the agents are able to evaluate the performance of a web site from the end user's perspective, and are able to measure the effects of the intervening network itself in addition to the performance of the web server. As a result, the performance seen by an agent can provide a reasonable approximation for the service experienced by customers connecting to the Internet at approximately the same location, and at approximately the same time as the agent.

While this is a useful indicator of server performance, it would further be useful if a process could be developed that could measure web server performance during a typical session where the web server is accessed by a user to do multiple tasks in a sequential order. In addition to measuring page download, many web sites, such as e-commerce web sites, are interested in measuring multi-step transactions. For example, systems that simply measure page downloads are not able to measure the time it takes for a user to perform a series of transactions which require the agent to send information back to the web server to complete the transaction. Common on-line transactions include booking an airline reservation, executing a stock transaction, checking the balance in a bank account, and purchasing a book or CD. In order to evaluate the performance of these sites, measurements are required for the entire transaction, not just the download time for a single page. For example, a user may want to access a web site having financial information. The user may login to the web site and then type in a stock symbol and retrieve a graph of the stock corresponding to the stock symbol. Next, the user may look up one or more other stock symbols and add those to the chart for the purpose of comparing the stocks. Finally, the user exits the web site, thus, ending the session. Complex transactions such as making a stock trade or searching for information involves a series of web pages and exercises multiple back end systems. Problems with any of these systems may cause the transaction to fail or slow down.

There is, therefore, a need for a method and system for simulating such a session for the web server and sending each of the requests generated by the user during the course of the session while measuring the response time of the server at each step. Thus, the performance of the web server during a typical transaction could be measured and elements which increase the time spent in the transaction could be identified and potentially reduced.

SUMMARY OF THE INVENTION

A method and system for evaluating quality of service over the Internet are disclosed. A method of the present invention includes measuring performance of a transaction over a network. The transaction comprises requesting information from a information source connected to a network and interacting with the information source. The method comprises connecting a data acquisition agent to the network, sending a request for information from the data acquisition agent to the information source, and loading data responsive to the request for information onto the data acquisition agent. The method further includes executing the transaction, collecting performance measurements for the transaction, and sending the performance measurements to a storage device.

In another aspect of the invention, a system for measuring performance of a transaction over a network generally comprises a data acquisition agent connected to the network and operable to send a request for information to the web server. The agent is configured to execute the transaction with the web server, collect performance measurements for the transaction, and send the performance measurements to a storage device.

A method of recording a transaction over a network generally comprises starting a recorder and sending a request for information from a computer to an information source over the network to begin the transaction. The method further includes loading a page responsive to the request for information onto the computer, entering data on the page, and sending the data to the information source. Once the transaction is completed, the recorder is stopped and the recording of the transaction is sent to a data acquisition agent on the network. The data acquisition agent is operable to play the recording and execute the transaction with the information source and collect performance measurements for the transaction.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

The following description is presented to enable one of ordinary skill in the art to make and use the present invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
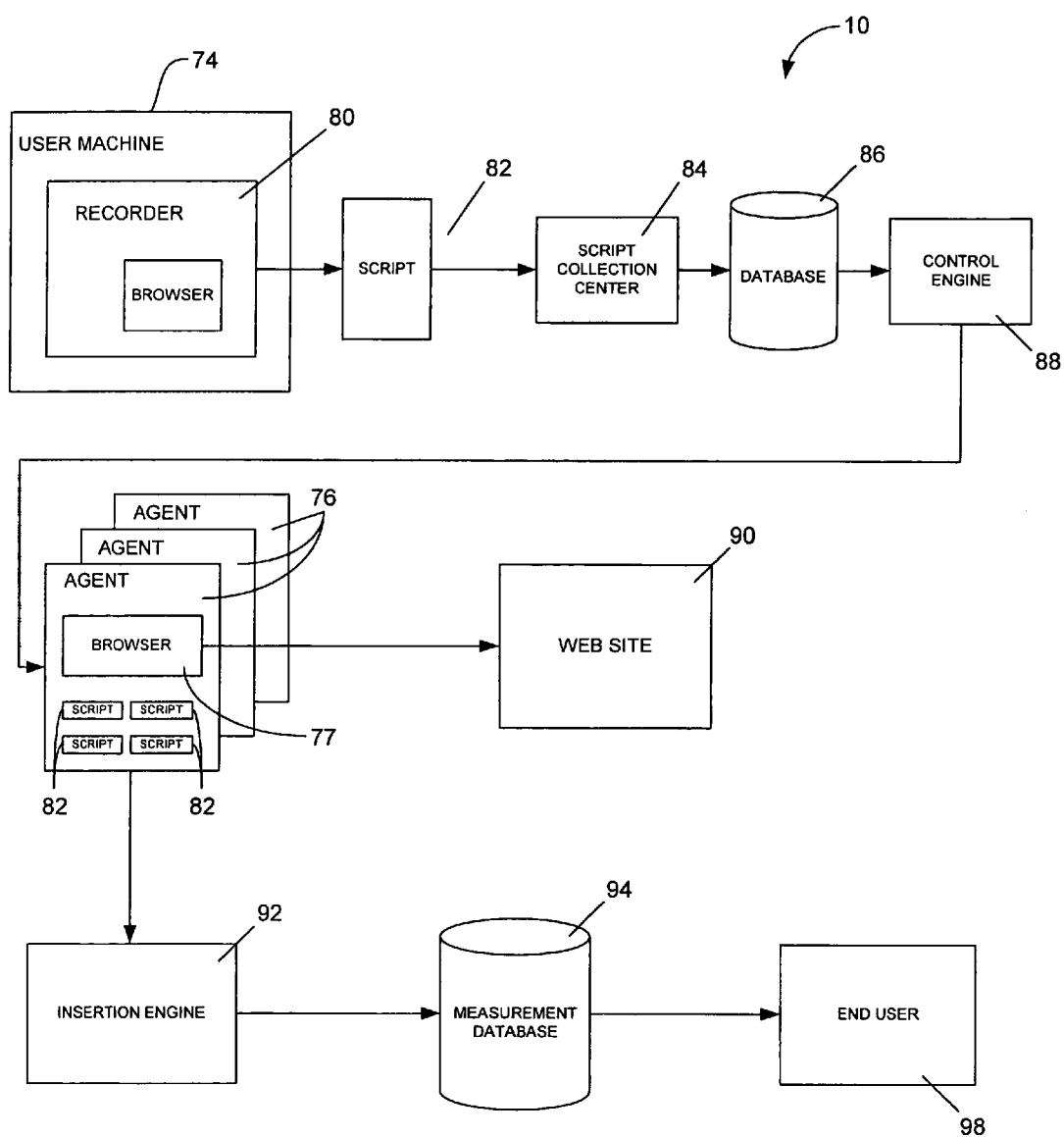
FIG. 1 is a block diagram of a system for measuring download time of a transaction at a Web site.

Referring now to the drawings, and first to FIG. 1, a system for recording and measuring multi-sequenced website transactions is schematically shown and generally indicated at 10. Transactions such as booking an airline reservation, executing a stock transaction, checking the balance in a bank account, or purchasing a book or CD may be analyzed, for example. The term transaction as used herein includes requesting information from an information source (e.g., web server) and interacting with the information source. The interaction may include entering a search query or selecting a product for purchase and entering credit card information, for example. The measurements may be used to analyze how content and back end applications perform at various times and locations. For example, the system 10 may be used to measure the performance of a web site transaction to determine if users are receiving adequate performance and help in debugging problems with a site when they occur. The system 10 allows web site owners to monitor and optimize the performance of transactions by online customers and manage the effect of content and back end applications by evaluating how long it takes to execute a multi-page interactive transaction. The system 10 may be used to detect problems such as content problems, web server problems, back end system problems, backbone problems, network problems, or combinations thereof. By breaking content download time into its constituent elements, the source of delays may be identified. Also, the geographic distribution of agents described below, allows for the identification of problems based on location. The data gathered by the system 10 provides information about the relationship between web content and Internet network delays which may be used by web architects to optimize page design.

Figure 2:
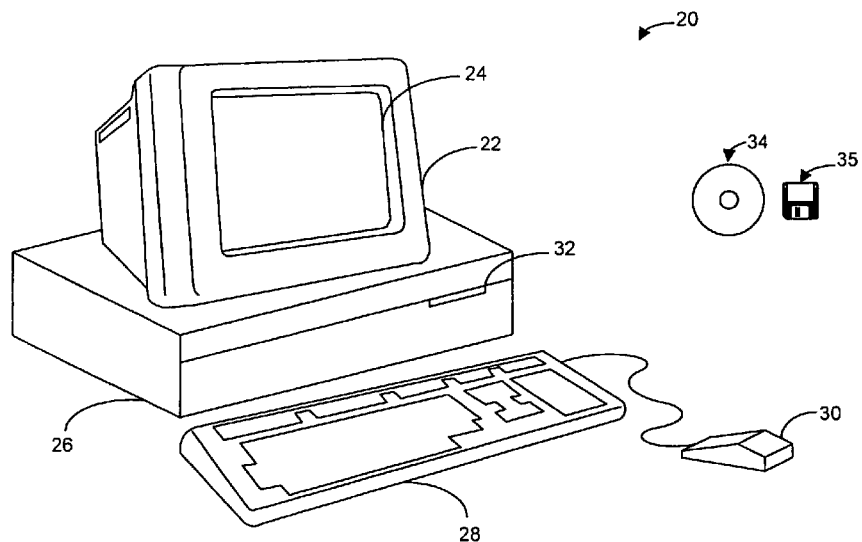
FIG. 2 is a schematic illustrating an example of a computer system that can be utilized to execute software of an embodiment of the invention.

FIG. 2 illustrates an example of a computer system that may be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 3) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium.

Figure 3:
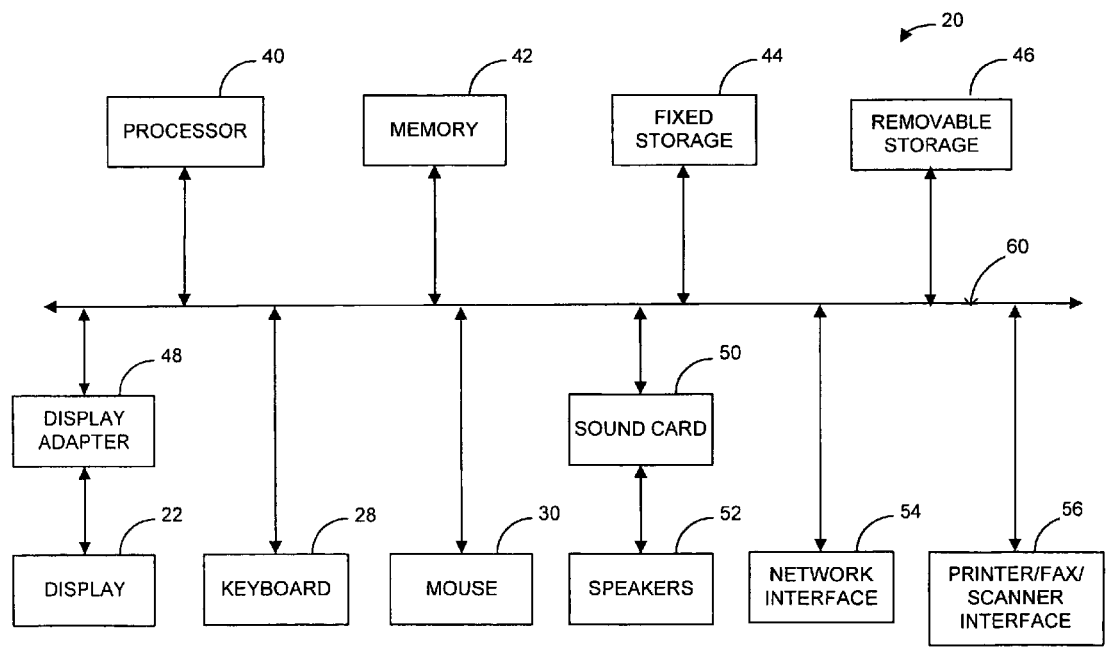
FIG. 3 is a system block diagram of the computer system of FIG. 2.

FIG. 3 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 3. However, these arrows are only illustrative of one possible interconnection scheme serving to link the subsystems. For example, a local bus could be utilized to connect the central processor 40 to the system memory 42 and display adapter 48. Computer system 20 shown in FIGS. 2 and 3 is but an example of a computer system suitable for use with the invention. Other computer architectures having different configurations of subsystems may also be utilized. For example, the agent computer systems typically do not include a display 22, screen 24, keyboard 28, or mouse 30.

Figure 4:
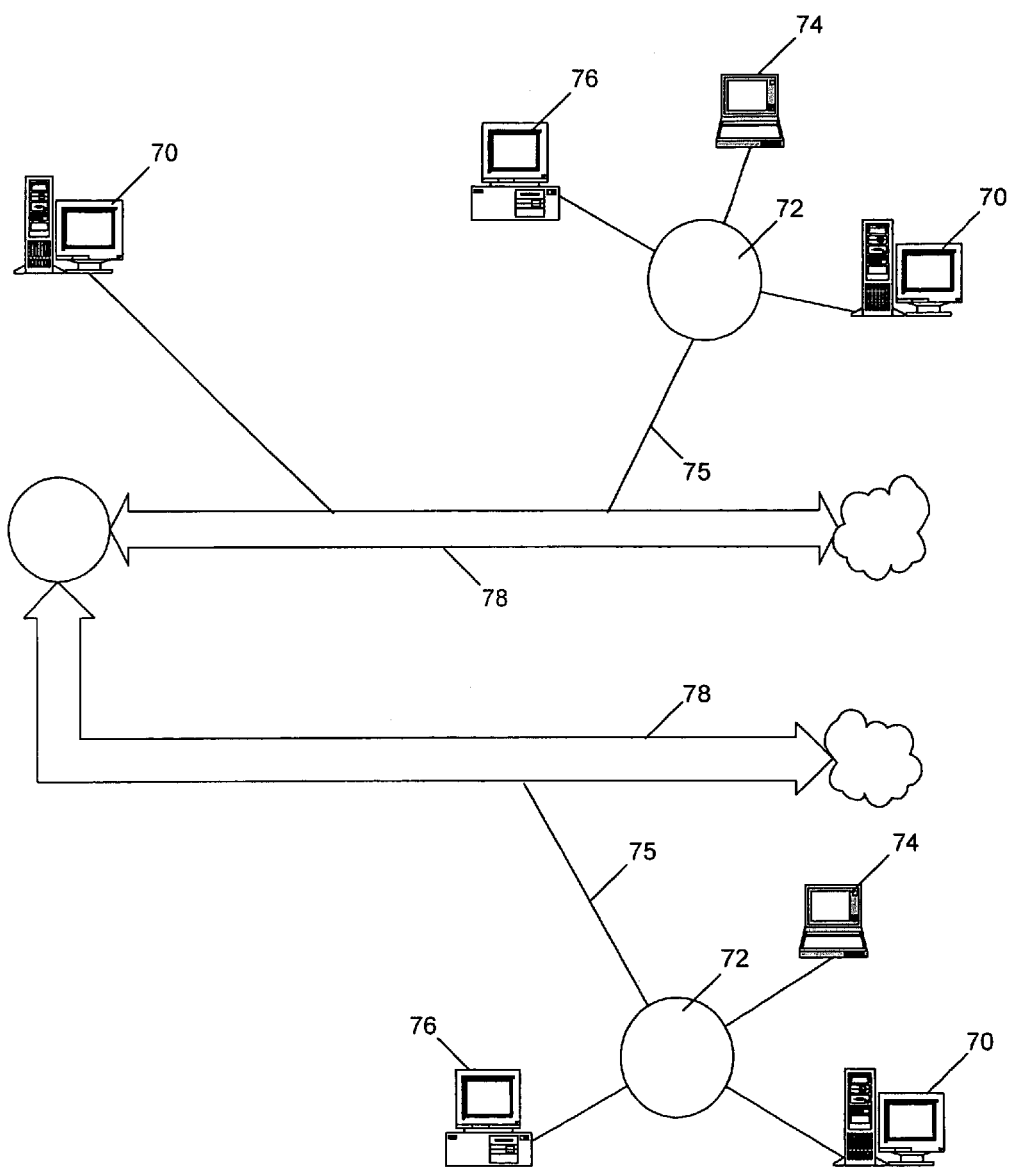
FIG. 4 is a schematic illustrating components within a network on which performance data can be collected in accordance with the present invention.

As shown in FIG. 4, the system may be used to collect performance data on a network. In one embodiment, the network is the Internet and the information is transmitted in the form of web pages. FIG. 4 illustrates the interconnection between components within the network. The network includes one or more servers 70 for hosting one or more network sites. The servers 70 are typically connected to the network at points of presence (POPs) 72, established by network service providers at a variety of geographic locations. Also connected to the network via POPs 72 are multiple users 74 and data acquisition agents 76. Transmission medium such as T1 and T3 lines, dial-up, DSL (Digital Subscriber Line), or cable connections may provide interconnections between the components within the network. A given geographic location, such as a metropolitan area, will typically contain multiple POPs 72 established by different network service providers. Each POP 72 may supply Internet connections to one or more users 74, servers 70, and agents 76. As illustrated in FIG. 4, the POPs 72 may be connected directly to an Internet backbone 78 via a relatively high-speed transmission medium 75 such as a T1 line. The connection between POPs 72, users 74, servers 70, and agents 76 may include any suitable transmission media, including, but not limited to, public telephone lines, T1 lines, T3 lines, and Ethernet connections.

It is to be understood that the network configuration and interconnections shown in FIG. 4 and described herein, are provided for purposes of illustration only. One of ordinary skill in the art will readily appreciate that the present invention may be practiced on networks more or less complex than that shown, in accordance with the teachings contained herein.

Referring again to FIG. 1, the system 10 generally includes a recorder 80 used to record a transaction on the network and create a script file 82, a script database 86 for storing the script files, a preference engine 88 for sending the script to a plurality of agents 76 which execute the script at a web site 90, collect download timing information, and send the timing information to an insertion engine 92, and a measurement database 94 for storing the timing information. In order to collect data on a specific transaction for which download information is desired, the transaction is first recorded using the system recorder 80. The recorder 80 creates the script file 82 and submits it to an operations center 84, where the script 82 is tested and entered into the script database 86. The script database 86 creates a list of scripts 82 for each of the agents 76 to run. The script files 82 are executed by the agents 76 which monitor the session and extract data relating to the performance of the server during the session. The agent 76 preferably passes one script 82 at a time to its browser 77, however, it may pass more than one script at a time. Each agent 76 sends download timing information gathered during execution of the script 82 to the insertion engine 92 located within a data collection server, which transfers the data to the measurement database 94. The measurement database 94 is preferably contained within a database server that is located at a download timing service center.

The transaction recorder 80 is used to capture inputs to forms included on web pages and mouse clicks made by a user, as described below. Once a script file 82 is created by the recorder 80 it is sent to the operations center 84 where it is tested to ensure that the script functions properly (e.g., does not create errors due to missing or inaccurate data or non-existent URLs). The script may be run periodically for an entire day, for example, to make sure it performs correctly at different operating times and when the servers are operating at different capacity levels. After the script 82 successfully passes testing, it is entered into the script database 86 along with other recorded script files 82. The preference engine 88 assembles a list containing all the scripts 82 within the script database for each agent 76. The list may also include a specific time and/or interval that each script is to be run. For example, the agent may be instructed to run each script one after another, run a script at a certain time interval after it begins to run the list of scripts, or run a script at a specific time. The preference engine 88 may send different lists to different agents 76 or groups of agents. The preference engine preferably updates the list at regular intervals to add new scripts or remove old scripts. The order that the scripts are executed may also be changed. Preferably, the agent 76 requests a new list of scripts 82 from the preference engine 88 at a specified interval (e.g., every hour).

If an agent 76 does not receive a new list of scripts 82 from the preference agent 88 it may run the old list again. The agent 76 preferably includes a monitoring device which monitors the last time the agent received a list of scripts 82 and the time at which the scripts were run. If an agent 76 is not able to send measurement data the agent will store the data until it can be sent. The scripts 82 may be encrypted before being sent to the agent 76 and then decrypted by the agent. It is to be understood that the management set up of the agents may be different than described herein. The agents 76 are preferably remotely managed.

The agents 76 are configured to receive commands (e.g., plurality of scripts 82 and instructions when to run or what order to run the scripts) from one or more external servers, automatically obtain web performance measurements, and send data to one or more databases 94 and servers. The agents 76 repeatedly access the web site 90, making repeated measurements and sending multiple reports to the data collection server. The agents 76 communicate the performance data that they have collected to the server via network connections and may forward the data to the server as soon as the data has been gathered, temporarily store the data before forwarding it to the server, or communicate data to the server in some other manner. The insertion engine 92 receives the performance data sent by the agents 76 and stores the data in one or more of the measurement databases 94. The insertion engine 92 may pre-process some or all of the data before storing it in the database 94, or it may simply pass the data on to the database directly. As further described below, end users 98 may query the database 94 to request performance parameters for a particular web site 90 and transaction.

In a preferred embodiment, the agents 76 obtain data from a server by sending an HTTP GET or POST request, for example, to the server and measuring how long it takes to download the requested information, starting from the time that the HTTP GET request was sent. When the agent 76 sends an HTTP GET request to the web server, the web server responds to the request by sending an HTML page. The agents 76 may begin to execute a script 82 by simply requesting a web page using the domain name (URL) for that page, similar to the way a human user typically requests a web page, and the network's domain name system (DNS) translates the domain name into an internet protocol (IP) address for routing to the server. Preferably, the agent 76 does not cache any files or DNS lookups between transactions. The agent may run a script in two modes, first time mode or experienced user mode. In the first time mode each transaction is performed as if it is being done by a first time user. No cookies are stored and nothing is cached. During a single transaction, however, components such as GIFs and DNS lookups may be cached. In the experienced user mode, cookies may already be stored and other information may be cached to simulate a return user running a transaction. Additional details regarding the measurement of download timing by agents may be found in U.S. patent application Ser. No. 08/868,616, referenced above, which is incorporated herein by reference in its entirety. However, any suitable method of measuring download times or other performance data with an agent may be used, without departing from the scope of the invention.

The agents 76 may comprise Windows NT computers which are connected directly to POPs 72 at facilities throughout the network, for example. The agents 76 preferably include a processor and memory, which may include high speed random-access memory (RAM) and non-volatile-storage such as a magnetic disk and read only memory (ROM). It will be understood that the agents 76 may comprise any suitable device and may be located at various geographic locations, without departing from the scope of the invention. The agents may run on any type of Internet connections, such as T1 lines, dial-up, DSL, 56 Kb, or cable modem, for example.

The agent preferably uses an Internet browser 77 such as Internet Explorer. The browser commands may be modified by the agent 76 so that information buried within the web page may be obtained, as is well known by those skilled in the art.

The measurement database 94 preferably contains the performance data obtained by the agents 76, collected by the insertion engine 92, and forwarded to the database 94. The data may include a plurality of records, each including a plurality of fields. The fields may include, for example, an agent identifier, a script identifier, date/time stamp indicating the date and time when the timing measurement was taken, and timing download information, as described below.

Figure 5:
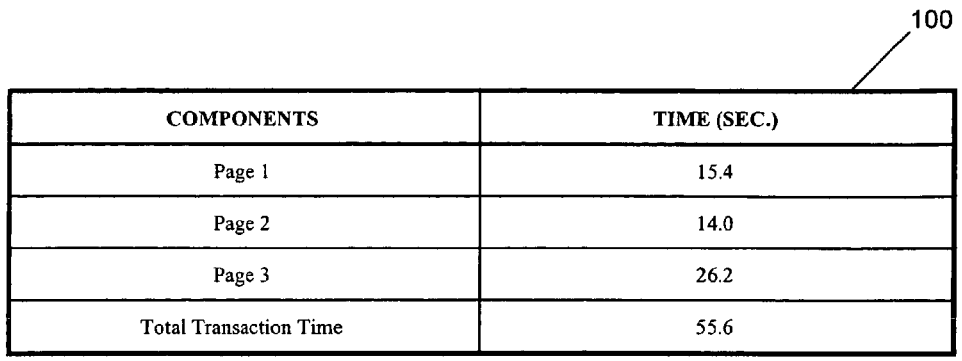
FIG. 5 is an exemplary table illustrating top level page download times for a transaction.
Figure 6:
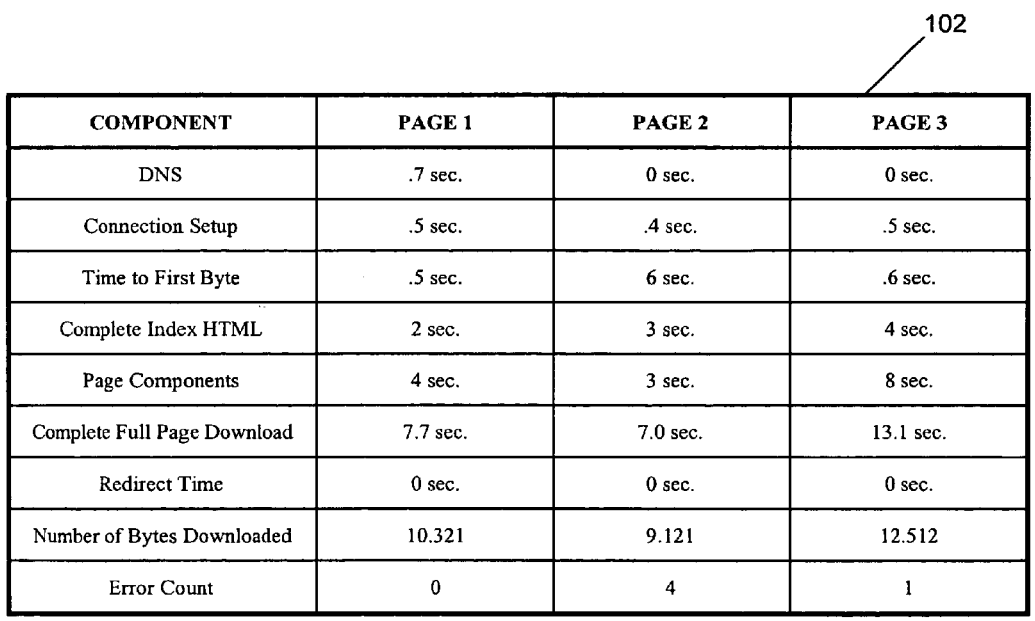
FIG. 6 is an exemplary table illustrating second level element download times for a transaction.

The system 10 may monitor a number of components during the transaction and breakdown the time of the entire transaction so that individual contributors may be analyzed. The data reported to the database 94 includes the overall time it took to complete a transaction (i.e., round trip response time for transaction) and component errors. Two additional levels of data are submitted to the database. The first is timing for the download of level one components. FIG. 5 shows a table 100 including sample download times for a transaction which requires the download of three web pages. The table 100 may also include steps that are completed by Java applets or Java scripts, for example. FIG. 6 shows a table 102 listing second level measurements including the time for individual parts of a file to download including DNS look up time, TCP connection setup, time taken to receive the first byte of information in response to an HTTP GET request, time to complete index HTML, time to download and decompress page components (e.g., GIF, JPEG), complete full page download time, redirect time, number of bytes downloaded, and error count. The individual components which are measured may include advertisement banners that appear on a web page, for example. This will let a web page owner know whether an advertisement banner is the slowest element on the page, or the banner is causing errors. Additional data such as the average login time and the percentage of successful logins may also be provided.

Whenever a page download completes successfully its measurement time is saved in the database. If an agent fails to download a page, it reports an error code (e.g., HTTP codes reported in the HTTP header, DNS error, web-server connection timeout) to the database. The agent may also report a time at which the error occurred. If an error occurs at any stage during downloading of the initial page the entire transaction is aborted. An error code is then reported for the entire transaction. If an individual element of a page such as a GIF causes an error, the error code and file are noted and the transaction continues. A list of GIFs or component URLs that failed may also be stored. If an intermediate step in the transaction fails, such as a search engine query does not return from the request and results in a page time out, the time and error may also be reported.

Figure 7:
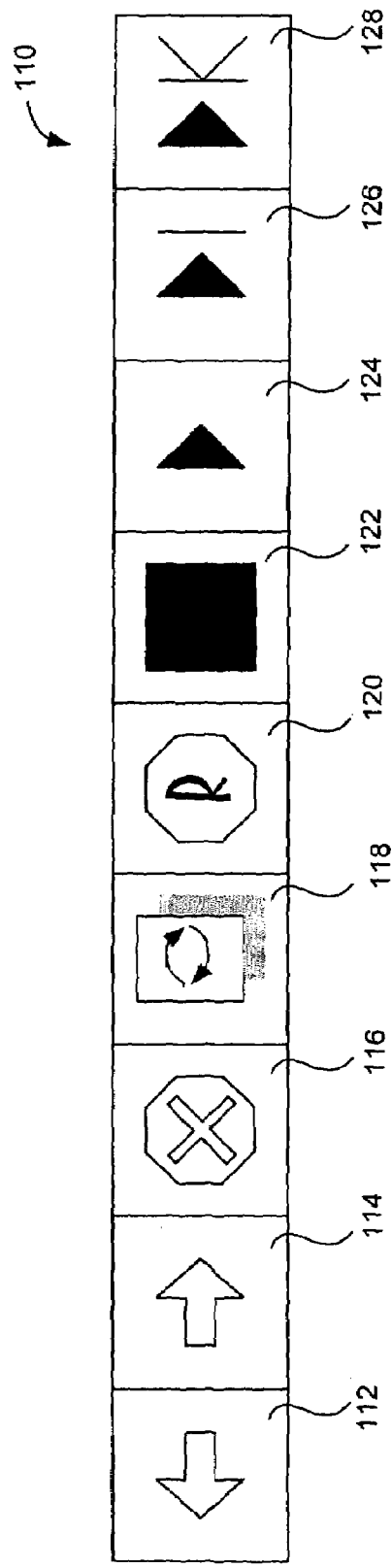
FIG. 7 is a schematic of a recorder toolbar used to record a web site transaction.

As described above, the recorder 80 is used to create the script files 82 which are executed by the agents 76 to collect performance measurements. The transaction recorder 80 includes a user interface having a web page viewing area, a toolbar (generally indicated at 110 in FIG. 7), and menu selections. The web page viewing area is the browser 77, which is embedded in the recorder 80. The toolbar 110 includes a plurality of buttons 112, 114, 116, 118, 120, 122, 124, 126, 128. The first four buttons 112, 114, 116, 118 are for browser control and are used to navigate a web site while a user is recording a transaction. The first button 112 is used to go back to the previous web page, button 114 is used to go forward, button 116 is used to stop the downloading of a web page, and button 118 is a refresh button used to reload the data on a web page. The next five buttons 120, 122, 124, 126, 128 are used to control the recording and playback of the script 82. Button 120 is used to start the recording of a transaction and button 122 is used to stop the recording when the transaction is completed. Button 124 is used to playback the entire script for review of the transaction and button 126 is used to step through the series of web pages in a transaction one at a time. Button 128 is used to submit the final recorded transaction to the operations center 84.

The menu items included in the recorder 80 may provide the same control as the toolbar 110 buttons along with other items that provide additional functionality for customizing script options. For example, a configure menu may include transaction options which allow a user to set an overall timeout (i.e., time limit) for the transaction. If a time limit is set and the transaction does not finish within the specified period of time when the script is run by the agent 76, the agent will stop the transaction. A page option may also be included to allow the user to select text that should either appear or not appear in order for the transaction to work properly. This allows a user to look for specific text which must appear in order to ensure that the correct page is reached when the agent 76 runs the script 82. Also, specific error pages which are commonly encountered may be specified as text that should not appear. If the conditions specified are not met when the script 82 is run, the transaction will result in an error code. These page options may be set when the script is replayed in step mode (button 126), for example. The script 82 may also be modified by an operator after it is sent to the operations center 84.

Figure 8:
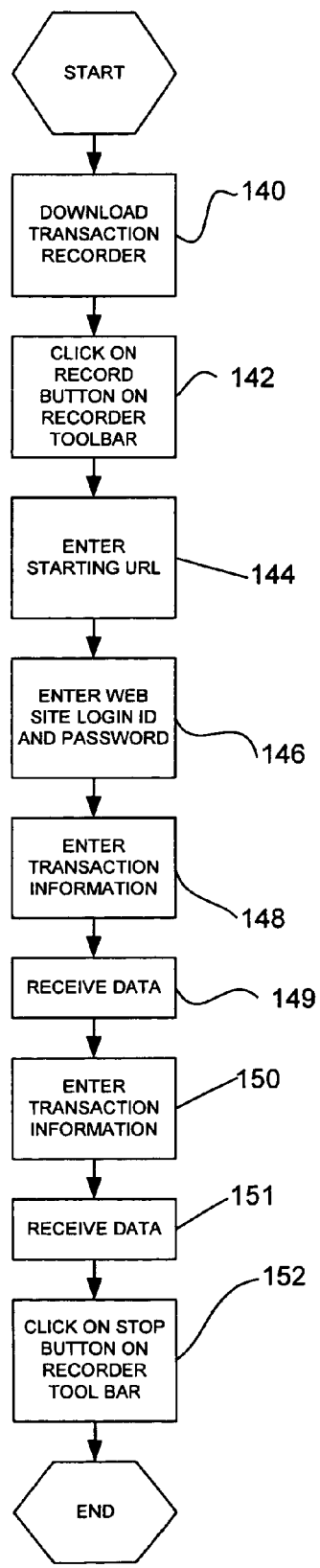
FIG. 8 is a process flowchart illustrating a process for recording a web site transaction.

FIG. 8 shows a flowchart illustrating a process for recording a transaction to create a script file 82. The transaction recorder 80 is first downloaded and launched at step 140. A user may enter a user ID and password if required. The user next clicks on the record button 120 on the recorder toolbar 110 and enters a starting URL (e.g., www.amazon.com) (steps 142 and 144). The user is then ready to execute the transaction. The user may be required to enter a user ID and password for the web site (step 146). This may be requested on the first page or subsequent pages during the transaction. If the user is buying a book, for example, the user may first enter a search query, and then enter the name of a book he wants to purchase after receiving the results of the query on the next web page. The user will then have to enter additional information, such as a credit card number and mailing address after a new web page is displayed and submit the order. This iterative process (shown in steps 148-151) may be repeated any number of times during the transaction. After the transaction is complete, the user clicks on the stop button 116 on the recorder toolbar 110 to complete the recording of the script file 82 (step 152).

Figure 9:
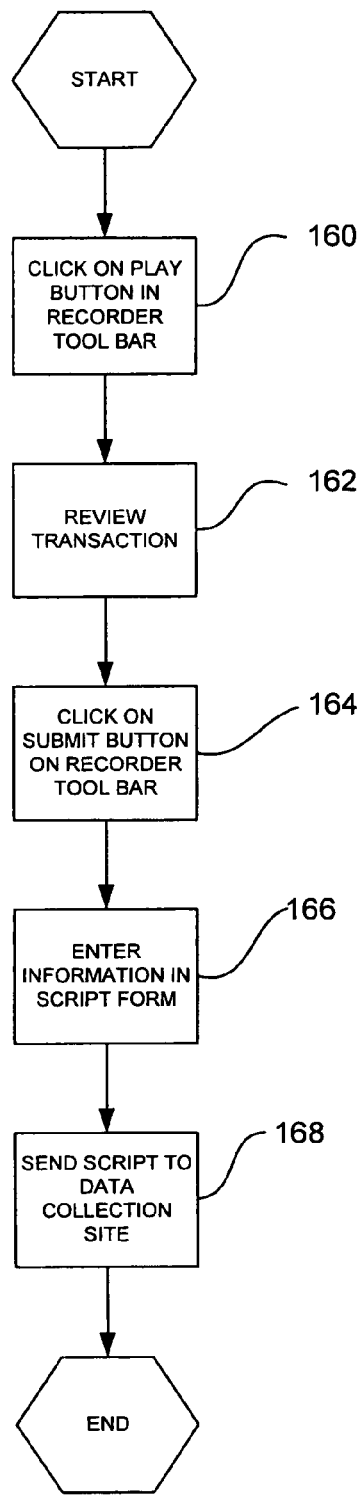
FIG. 9 is a process flowchart illustrating a process for testing and submitting a script containing a recorded transaction.

A process for testing the script 82 and sending the script to the operations center 84 is illustrated in the process flowchart of FIG. 9. The user first clicks on the play button 124 (step 160) of the recorder toolbar 110 to review the transaction (step 162). The series of web pages displayed during the transaction along with the information entered by the user will be sequentially displayed to the user. The user may also step through the pages by selecting the step button 126 on the recorder toolbar 110. After the user has reviewed the transaction and is satisfied with the script 82, the user clicks on the submit button 128 on the recorder toolbar 110

(step 164). The user may then be requested to fill out a script information form to send along with the script file 82 (step 166). The script and associated information is sent by the user to the data collections site for further processing (step 168).

In order for the agent to simulate the selecting of links on a web page by a user to link the pages together during the transaction and complete the transaction, state information on a web page may need to be updated when the agent runs the script 82. For example while running a script 82 the agent 76 may search for text within the HTML and insert it into the next URL. The following are examples of different types of substitution that may be used to update the state information and link the pages together. The first substitution type is used when a session ID is a hidden variable within the HTML. For example, before the substitution is made, the URL may appear as:
    http://www.mysite.com?user_id=1234

The HTML text that the agent 76 searches for may be as follows:
    <Form Name="login" . . . >
    <Input Type="hidden" Name="user$_{13}$ id" Value="1234">
    . . .
    </Form>

The substitution may begin and end with a code such as <tab>$~$<tab>. The first significant field will be a digit that tells which type of substitution to perform. The remaining text and number depend on the type of substitutions.

The substitution for the above example is:
    <t>$~$<t>1<t>1<t>Form_Name=login: Control_Name=user_id<t>$~$<t>

The new URL then becomes:
    http://www.mysite.com?user_id = <t> $ ~ $ <t> 1 <t> 1<t> Form_Name=login:Control
    Name=user_id<t>$~$<t>.

The hidden form field in the above example is "1234". This is a unique tag which is generated within the web page and passed back to the server by the agent to continue with the transaction.

The next four examples of substitution use search actions to find specific data within the HTML page. The following substitution is a general text search. The URL before the search and substitution is as follows:
    http://www.mysite.com?user_id=1234

The relevant HTML text is as follows:
    <Form Name="login" . . . >
    <Input Type="text" ReadOnly Value="user_id is 1234. Date is 9/19/99
    1:00:00AM">
    . . .
    </Form>

The substitution is:
    <t>$~$<t>99<t>1<t>Begin_Text=user_id is $:$End_Text=Date is <t>$~$<t>

The new URL then becomes:
    http://www.mysite.com?user_id = <t> $ ~$ <t> 99 <t> 1<t>Begin_Text=user_id is
    $:$End_Text=Date is <t>$~$<t>.

The following examples illustrate frame search substitution, anchor URL search substitution and form action URL search substitution.

Frame Search:

Before Substitution:
    http://www.mysite.com?user_id=1234

Relevant HTML text:
    <frame    src="logonForm.asp&user_id=1234" name="first">

The substitution is:
    <t>$~$<t>2<t>1<t>Frame_Name=first: Variable_Name=user_id<t>$~$<t>

The new URL is:
    http://www.mysite.com?user_id=<t>$~$<t>2<t>1<t>

Anchor URL Search:

Before Substitution:

http://www.mysite.com?user_id=1234

Relevant HTML text:
    <A href=http://www.mysite.com?user_id=1234>Text</A>

The substitution is:
    <t>$~$<t>6<t>1<t>1Search_Term=mysite.com<t>$~$<t>

The new URL is:
    http://www.mysite.com?user_id=<t>$~$<t>6<t>1<t>1<t>Search_Term=mysite.
    com<t>$~$<t>

Form Action URL Search:

Before Substitution:
    http://www.mysite.com?user_id=1234

Relevant HTML text:
    <FormName="login" Action="http://www.mysite.com-?date=1/1/90&user_id=12
    34">
    . . .
    </Form>

The substitution is:
    <t>$~$<T>7<t>1<t>1<t>Form_name=login: Search_Term=user_id<t>$~$<t>

The new URL is:
    http://www.mysite.com?user_id=<t>$~$<t>7<t>1<t>1<t>Form_name=login:
    Search_Term=user_id<t>$~$<t>

The substitution types shown above are examples of search and substitution formats used to find relevant text within the HTML that is used to link a web page to the next web page to complete a transaction. Other substitution formats may be used without departing from the scope of the invention.

Figure 10:
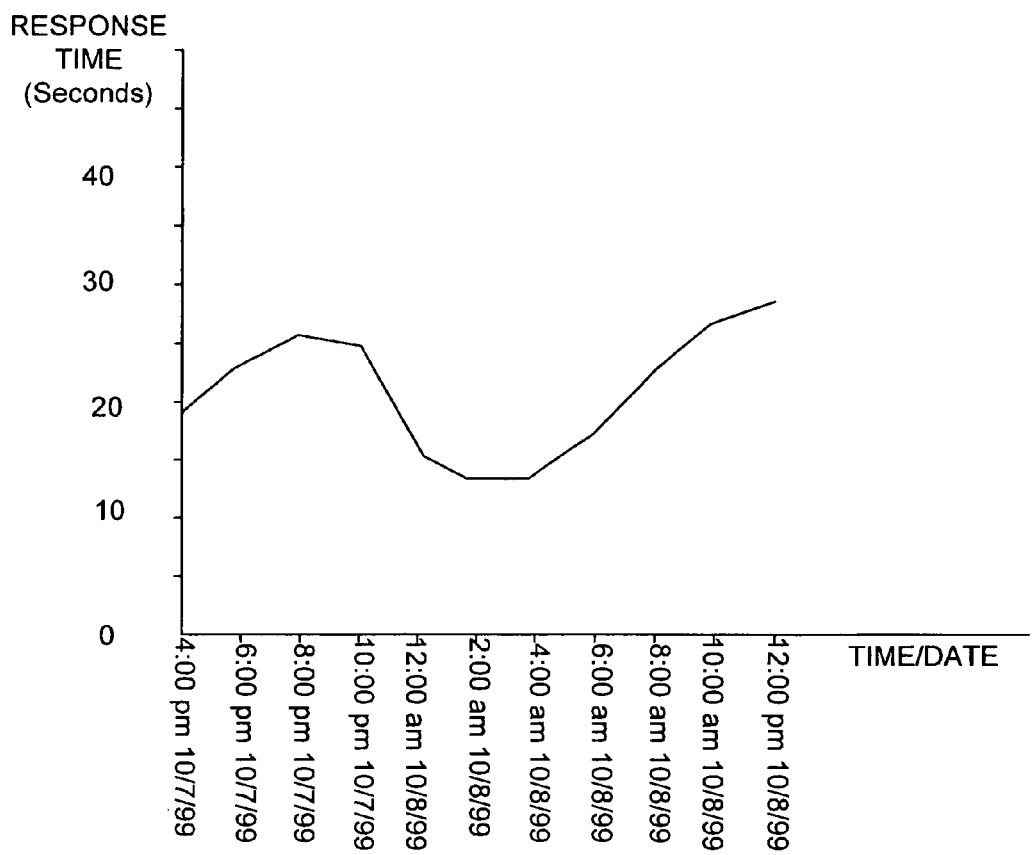
FIG. 10 is a graph illustrating web site performance at various times.
Figure 11:
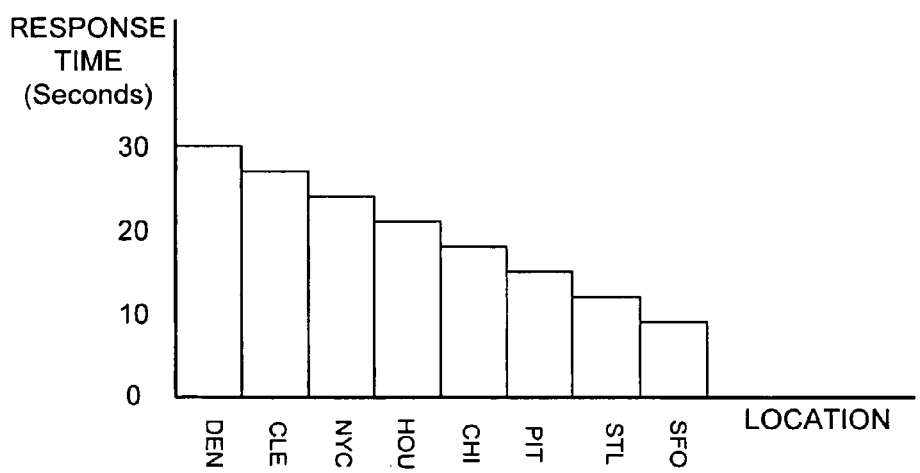
FIG. 11 is a bar chart illustrating web site performance at various locations.
Figure 12:
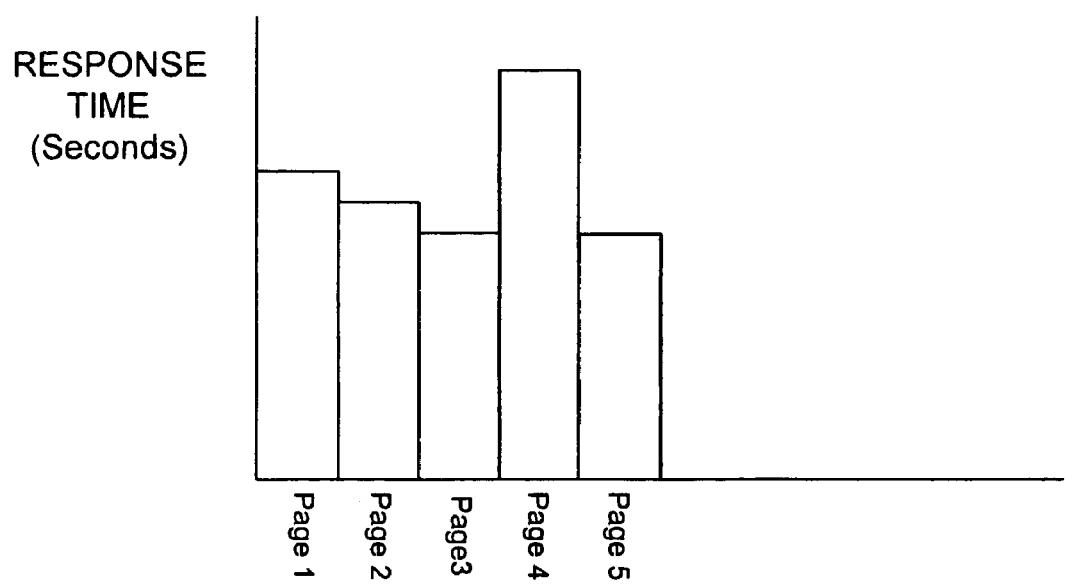
FIG. 12 is a bar chart illustrating web site performance for each web page displayed during a transaction.

After the script 82 is processed by the agents 76, the data collected by the agents may be viewed on a web site, for example. The data may also be sent via e-mail. A user may specify a list of scripts 82 for which performance data is desired by inputting a script file name. The user may also specify the type of performance data that is desired. FIGS. 10 and 11 illustrate various ways of displaying performance data to a user. FIG. 10 shows a graph wherein the typical download times experienced at a web site are plotted versus time. As shown in FIG. 10, the performance of a specific transaction web site may be plotted over a period of time at specific intervals (e.g., 1 hour). A graph of other web sites, such as a competitor's web site may also be plotted on the same graph to compare performance of web sites, for example. FIG. 11 is a bar graph showing the typical download times experienced by users at different geographic locations. Additional details may also be viewed for transactions at one or more of the locations to identify problems in a specific location. Each bar represents the average download time for a transaction that users in a particular city experienced. A similar chart may be provided with various networks (e.g., GTE, AT&T, Sprint) shown on the horizontal axis rather than the location. A graph showing download times for each page (as shown in FIG. 12) or page components may also be provided. Detailed information on errors may also be provided.

FIGS. 10, 11, and 12 are merely illustrative of several preferred ways of displaying data collected in accordance with the principles of the present invention, and many other display formats may be used. For example, the graphs may be modified to display the performance data from individual agents or the performance data for more than one transaction.

The system 10 may also include an alarm which automatically alerts the owner of a web site when the web site becomes unavailable to customers, due to problems with the server, the Internet link being down, or problems with a network provider. An alarm may be set, for example, if more than three cities show a response time fifty percent above a typical peak response time. Once an alarm is set, the system 10 may be used to determine if the problem is with the Internet, network provider, link to the Internet, web server, or web content. The alarm may be sent to a web page owner by e-mail or pager, for example.

A method and system for evaluating transaction service to a user over the Internet has been disclosed. The method disclosed may also be applied to other network computing environments, including public or private Internets or Intranets. Download time, or any other performance parameter that is desired, may be measured using an agent that monitors information as it is transmitted between parties.

Although the present invention has been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method of measuring performance of a web-site transaction between a data acquisition agent and an information source over a network, the transaction comprising requesting information from the information source connected to the network and interacting with the information source, the method comprising:

receiving at the data acquisition agent, a transaction previously recorded between a user machine and the information source;

sending a request for information to the information source from the data acquisition agent connected to the network to begin the transaction;

loading data responsive to the request for information onto the data acquisition agent from the information source;

continuing the transaction between the information source and the data acquisition agent by simulating said transaction previously recorded between the user machine and the information source, wherein simulating said transaction comprises updating state information on a web page and linking web pages together;

collecting performance measurements by the data acquisition agent for the transaction, wherein said performance measurements comprise download time of data during said transaction and includes browser execution time; and sending the performance measurements collected by the data acquisition agent to a storage device.

2. The method of claim 1 wherein collecting performance measurements comprises collecting download time of the data in response to the request for information.

3. The method of claim 1 wherein collecting performance measurements comprises collecting number of bytes downloaded for the transaction.

4. The method of claim 1 wherein collecting performance measurements comprises identifying errors occurring during the transaction.

5. The method of claim 1 wherein the network is the Internet.

6. The method of claim 1 wherein the information source is a web server and the request for information comprises requesting a web page.

7. The method of claim 6 wherein collecting performance measurements comprises collecting download time for each web page downloaded during the transaction.

8. The method of claim 7 wherein collecting performance measurements comprises collecting download time for individual components within each of the web pages.

9. The method of claim 1 further comprising displaying the performance measurements on a web site.

10. The method of claim 1 wherein continuing the transaction comprises sending a query from the data acquisition agent to the information source after the data is loaded.

11. The method of claim 1 wherein continuing the transaction comprises submitting an order from the data acquisition agent to the information source after the data is loaded.

12. The method of claim 1 wherein continuing the transaction comprises updating state information to link web pages together within a transaction.

13. The method of claim 12 wherein updating state information comprises searching for a session ID.

14. The method of claim 12 wherein updating state information comprises searching for text.

15. The method of claim 12 wherein updating state information comprises searching for a frame.

16. The method of claim 12 wherein updating state information comprises searching for a URL.

17. The method of claim 12 wherein updating state information comprises substituting HTML text.

18. The method of claim 1 further comprising
connecting the data acquisition agent to the network.

19. The method of claim 18 wherein connecting the data acquisition agent to the network comprises connecting a plurality of data acquisition agents to the network at a plurality of locations.

20. The method of claim 1 wherein the data acquisition agent interacts with the information source with a browser.

21. The method of claim 1 wherein updating state information comprises performing a data substitution for a hidden variable.

22. The method of claim 1 further comprising searching for data to substitute utilizing one of a frame search substitution, anchor URL search, or form action URL search.

23. A system for measuring performance of a web-site transaction between a data acquisition agent and a web server over a network, the transaction comprising requesting information from the web server connected to the network and interacting with the web server, the system comprising:

the data acquisition agent configured to receive a previously recorded transaction between a user machine and the web server, send a request for information to the web server to begin the transaction, load data responsive to the request for information onto the data acquisition agent from the web server, continue the transaction between the web server and the data acquisition agent by simulating the transaction previously recorded between the user machine and the web server, collect performance measurements for the transaction, and send the performance measurements to a storage device;

wherein said performance measurements comprise download time of data during said transaction and includes browser execution time, and simulating said transaction comprises updating state information on a web page and linking web pages together.

24. The system of claim 23 wherein the data acquisition agent includes a browser embedded within the agent.

25. The system of claim 24 wherein the data acquisition agent is configured to receive said recorded transaction over the network.

26. The system of claim 24 wherein the data acquisition agent is configured to receive instructions specifying a plurality of said recorded transactions to execute.

27. The system of claim 26 wherein the data acquisition agent is configured to repeat execution of said specified transactions until new instructions are received.

28. The system of claim 23 wherein the performance measurements include a list of errors occurring during the transaction.

29. The system of claim 23 wherein the performance measurements comprise download time for each web page downloaded during the transaction.

30. The system of claim 29 wherein the performance measurements comprise download time for individual components within each of the web pages.

31. The system of claim 23 further comprising a monitoring device for recording when the agent last executed the transaction.

32. The system of claim 23 wherein the agent is operable to store the collected performance measurements.

* * * * *